United States Patent [19]

Willemen

[11] Patent Number: 5,481,087
[45] Date of Patent: Jan. 2, 1996

[54] SOLDERING APPARATUS WITH IMPROVED FILTER

[75] Inventor: Lambertus P. C. Willemen, Dorst, Netherlands

[73] Assignee: Soltec B.V., Oosterhout, Netherlands

[21] Appl. No.: 119,129

[22] PCT Filed: Mar. 16, 1993

[86] PCT No.: PCT/NL93/00063

§ 371 Date: Nov. 17, 1993

§ 102(e) Date: Nov. 17, 1993

[87] PCT Pub. No.: WO93/01882

PCT Pub. Date: Sep. 30, 1993

[30] Foreign Application Priority Data

Mar. 17, 1992 [NL] Netherlands ................... 9200498

[51] Int. Cl.⁶ .................... F27B 9/04; F27B 9/30
[52] U.S. Cl. ............. 219/388; 219/400; 55/267; 55/269
[58] Field of Search ............... 219/388, 400; 165/154, 155; 55/267, 268, 269

[56] References Cited

U.S. PATENT DOCUMENTS

| 212,855 | 3/1879 | Lewis | 55/267 |
| 1,335,348 | 3/1920 | Patrick et al. | 55/267 |
| 1,680,840 | 8/1928 | Barnebey | 55/267 |
| 3,752,642 | 8/1973 | Early et al. | |
| 3,782,115 | 1/1974 | Johnson | 55/267 |
| 3,982,588 | 9/1976 | Darm | 55/267 |
| 4,951,401 | 8/1990 | Suzuki et al. | |

FOREIGN PATENT DOCUMENTS

| 0109892 | 5/1984 | European Pat. Off. . |
| 4-262863 | 9/1992 | Japan . |

Primary Examiner—Teresa J. Walberg
Assistant Examiner—J. Pelham
Attorney, Agent, or Firm—Banner & Allegretti, Ltd.

[57] ABSTRACT

A soldering device has a chamber; soldering means for soldering objects which are transported through the chamber; a transporting means in the chamber for transporting the objects for soldering along a transport route; a cleaning means for cleaning gases present in the chamber, which cleaning means being connected to the chamber with a feed line and a discharge line; and a fan situated in one of the lines. A cooling device to cool the gases is situated in one of the lines. The soldering device is preferably a reflow-soldering device, wherein the soldering means are formed by heating means.

13 Claims, 2 Drawing Sheets

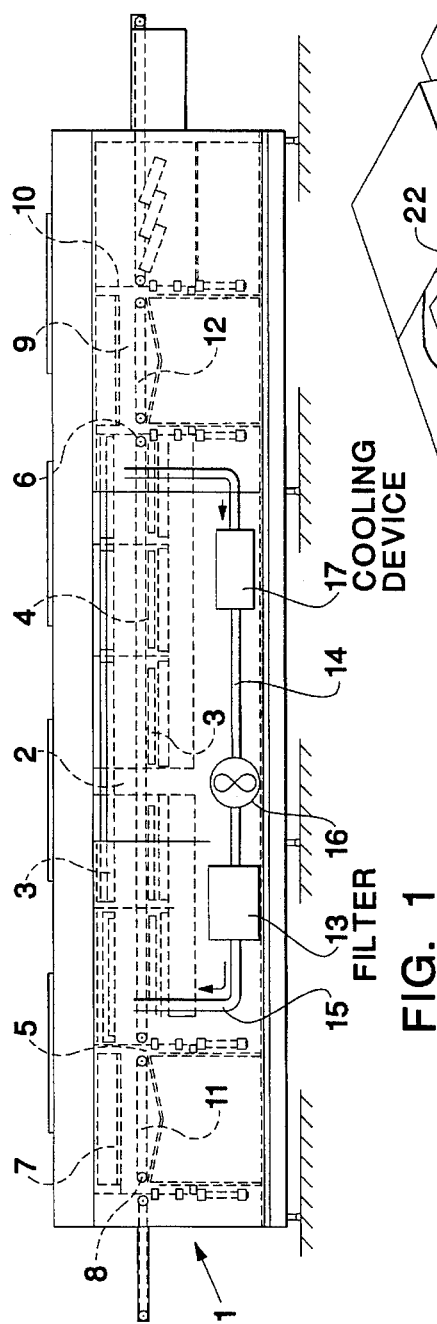
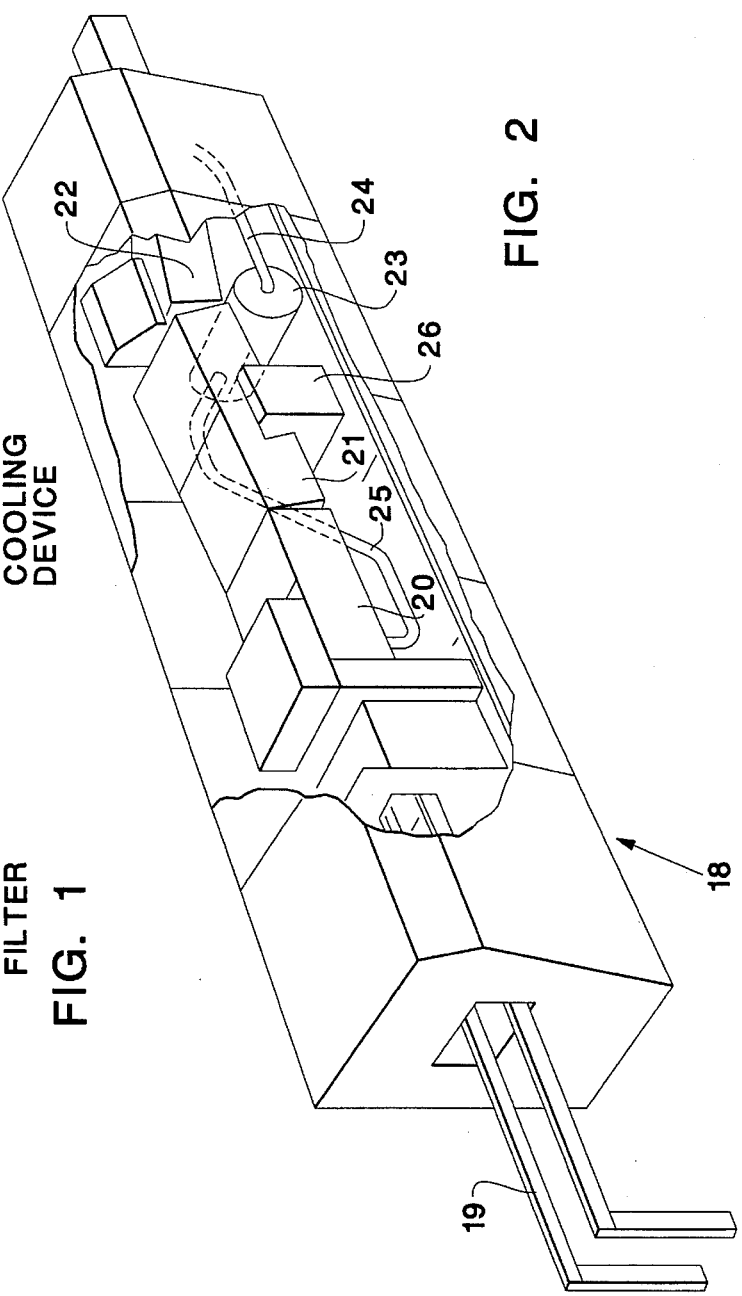

SOLDERING APPARATUS WITH IMPROVED FILTER

BACKGROUND OF THE INVENTION

The invention relates to a soldering device comprising:

a chamber;

heating means for heating the objects for soldering present in the chamber;

a transporting device present in the chamber for transporting the objects for soldering;

a cleaning device for cleaning the gases present in the chamber, which cleaning device is connected to the chamber with a feed line and a discharge line; and a fan arranged in one of the lines.

Such a soldering device is known from U.S. Pat. No. 4,951,401.

The filter used in this known soldering device serves to remove waste products from the gases present in the soldering chamber. These waste products occur as a consequence of the soldering process taking place in the soldering chamber, for instance as a result of the reflow-soldering process, wherein the solder paste comprises substances which evaporate on heating. Waste products can further occur for instance due to evaporation of the fluxes used during the normal soldering using a solder wave.

These waste products are present in the soldering chamber mainly in gaseous form. When these gases are passed through the filter they will scarcely be restrained by the filter, so that the greater part of these waste products is fed back again to the soldering chamber and the filter has hardly any effect.

The object of the present invention is to provide such a soldering device wherein the filter is effective.

This object is achieved in that a cooling device is arranged in one of the lines.

As a result of this step the gases flowing through the filter have a lower temperature so that condensation of the harmful substances can occur and these remain behind in the filter. The effectiveness of the filter is thus increased.

According to a preferred embodiment the cooling device is combined with the cleaning device into one unit.

It will be apparent that, when cooling and cleaning take place inside the same unit, the effectiveness of the cleaning is greatest; precisely at the position where they are removed the harmful substances are cooled in order to cause condensation. Condensation therefore occurs at the location where the separation of the liquid substances takes place most effectively.

According to a second preferred embodiment the unit is adapted for stepwise alternating cooling of the gas and cleaning thereof by means of filters. This step also results in an improved effectiveness of the cleaning process.

BRIEF DESCRIPTION OF THE DRAWINGS

The invention will subsequently be elucidated with reference to the annexed figures, in which:

FIG. 1 shows a schematic sectional view of a first embodiment of a device according to the invention;

FIG. 2 shows a partly broken away perspective view of a second embodiment of the device according to the invention.

DETAILED DESCRIPTION OF THE INVENTION

Figure 3:
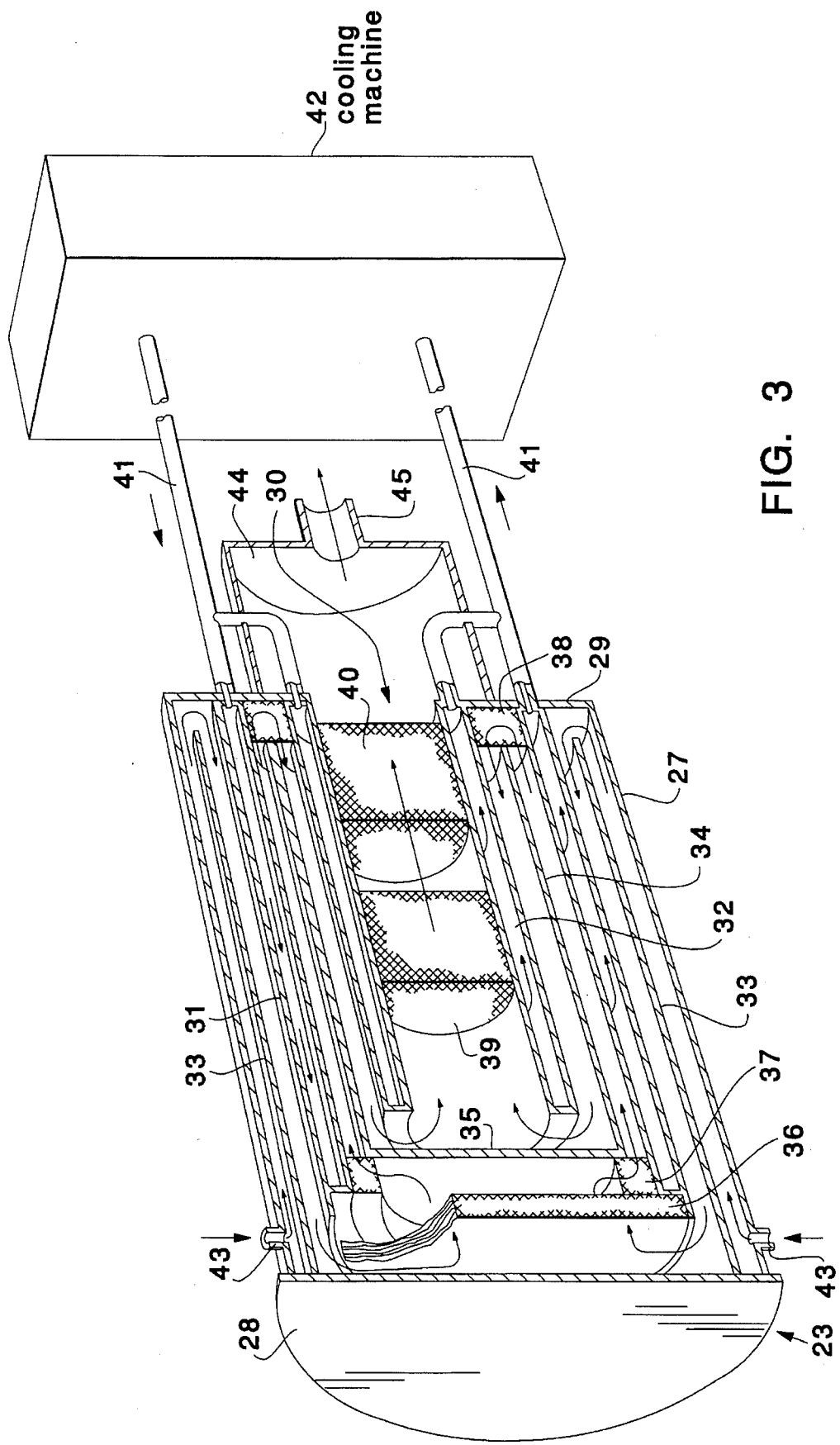
FIG. 3 is a sectional view of a combination of a filter and a cooling unit for use with an embodiment according to the invention.

The soldering device 1 shown in FIG. 1 comprises a soldering chamber 2 in which are arranged heating elements 3 in the form of infrared radiators. However, it is also possible to employ other heating elements.

A conveyor belt 4 is arranged in the soldering chamber for transporting the printed circuit boards for soldering, while at both the inlet side and the outlet side the soldering chamber is closed off by means of the respective doors 5, 6. Located upstream of door 5 is a first lock chamber 7 which is closed off from the outside environment by means of a door 8. Located downstream of door 6 is a lock chamber 9 which is separated from the outside environment by a door 10. Further arranged in the lock chambers are respective conveyor belts 11 and 12.

The operation of this soldering device is such that the printed circuit boards for soldering supplied from outside are carried through the opened door 8 to the lock chamber 7, whereafter the door 8 closes, the door 5 is opened and the printed circuit board for soldering is carried by the conveyor belt 11 to soldering chamber 2 where it is transported by the conveyor belt present therein. While they are moving through soldering chamber 2 on conveyor belt 4 the objects for soldering are heated by the heating devices 3. The heating devices 3 are controlled herein such that a certain heating profile results. After ending of the soldering process the printed circuit board for soldering is transported through the door 6 to the lock chamber 7, whereafter the door 6 is closed, door 10 opened and the printed circuit board discharged.

During soldering chemical processes take place on the printed circuit board caused by the high temperatures required for the soldering process, whereby reaction products are created which can contaminate the interior of the soldering chamber. This has an adverse effect on the good operation of the components present in the soldering chamber, including the heating devices and the transporting device.

To obviate this problem a filter unit 13 is arranged which in the present embodiment is placed under the soldering device.

Arranged for feed of the gas is a feed line 14 which draws in contaminated gas, through cooling device 17 in the part of the soldering chamber located furthest downstream. The filter unit is further connected by means of a discharge line 15 to a part of the soldering chamber located upstream. A fan 16 is arranged in the discharge line 15.

Shown in FIG. 2 is a soldering machine 18 through which extends a conveyor belt 19 for the printed circuit boards for soldering. Incorporated in the soldering machine 18 is a fluxer 20, in addition to a pre-heating device 21 and a soldering device 22. Placed beneath the soldering device is a combination unit 23 of a filter and a cooling device according to the present invention. This unit is connected by means of a feed line 24 to a part of the soldering machine located downstream, while the unit is connected by means of a line 25 to a part of the soldering machine located upstream.

The soldering machine can be formed by a normal soldering device operating with ambient air, but it will be apparent that the best cleaning results are obtained with a soldering machine which operates with gas substantially excluding oxygen and which, like the embodiment shown in FIG. 1, is connected by locks to the outside air in order to prevent as far as possible the entry of ambient air, and therefore oxygen.

The construction of the cooling and filtering unit will now be described with reference to FIG. 3. The cooling and soldering unit 23 depicted in FIG. 3 is formed by a substantially cylindrical housing 27, one side of which is closable by means of a cover 28. Arranged on the other side of cylindrical housing 27 is a fixed cover 29, in the centre of which is arranged an opening 30. Two cylinder jacket-like cooling elements 31 and 32 are arranged in the housing, both fixed to the end wall 29.

Further, a first guide cylinder 33 is fixed to the removable cover and more to the center a second guide cylinder 34 is arranged which extends between the first cooling element 31 and the second cooling element 32. This second guide cylinder 34 is supported by means of spacers not shown in the drawing. This cylinder is further provided with a fixed cover 35.

Arranged further on the end wall of the first cooling element is a coarse filter 36 followed more toward the inside by an annular first fine filter 37. The second annular filter 38 is further arranged between both cooling elements 31, 32 and the end wall 29 and the second guide cylinder, while in the interior of the second cooling element are fixed two fine filters 39, 40.

Both cooling elements 31, 32 are connected by means of connecting lines 41 to a cooling machine 42.

The operation of this combined filtering and cooling unit will now be described. The gases for cleaning are supplied via feed lines 43, whereafter they are distributed tangentially over the periphery of the combination device, wherein the gases are guided between the cylindrical housing 27 and the first guide cylinder. When the thus guided gases have reached the end wall 29 they reverse direction and are guided between the first guide cylinder 33 and the first cooling element 31, wherein a cooling of the gases takes place. On reaching the cover 28 the gases pass through the coarse filter 36, wherein coarse impurities and dust are collected, and the first condensed droplets are collected. The gases then pass through the annular fine filter 37, are guided between the first cooling element 31 and the second guide cylinder 34 and thus further cooled. When reaching the filter 38 the gases reverse direction, wherein droplets condensing during the further cooling are collected, and the gases are further guided between the second guide cylinder 34 and the second cooling element 32 in the direction of the cover 35 where they reverse direction and are subsequently guided through the interior of the second cooling element 32 through filters 39, 40 to a collection space 44 and are discharged via outlet duct 45.

I claim:

1. In a soldering device comprising:

a chamber;

soldering means for soldering objects for soldering which are transported through the chamber;

a transporting means in the chamber for transporting the objects for soldering along a transport route;

a cleaning means for cleaning gases present in the chamber, said cleaning means being connected to the chamber with a feed line and a discharge line; and a fan situated in one of the lines, the improvement comprising:

means for cooling said gases being situated in one of the lines.

2. The improvement as claimed in claim 1, and further comprising:

the soldering device being a reflow-soldering device utilizing a solder paste applied to said objects; and the soldering means comprising means for heating said solder paste.

3. The improvement as in claim 2, and further comprising:

the cooling means being combined with the cleaning means into one unit.

4. The improvement as claimed in claim 1, and further comprising:

the cooling means being combined with the cleaning means into one unit.

5. The improvement as claimed in claim 1, and further comprising:

inlet and outlet openings of the soldering device having means for keeping gases inside the chamber.

6. The improvement as claimed in claim 1, and further comprising:

an inlet of the feed line being situated in a downstream portion of the chamber and an outlet of the discharge line being situated in an upstream portion of the chamber.

7. In a reflow soldering a device utilizing a soldering paste applied to objects for soldering, comprising:

a chamber;

means for heating the soldering paste on the objects which are transported through the chamber;

a transporting means in the chamber for transporting the objects for soldering along a transport route;

a cleaning means for cleaning gases present in the chamber, said cleaning means being connected to the chamber with a feed line and a discharge line; and a fan situated in one of the lines, the improvement comprising:

means for cooling said gases being combined with the cleaning means into one unit; and said means for cooling the gases, alternating stepwise with said cleaning means.

8. The improvement as claimed in claim 7, and the unit further comprising:

at least one hollow cylinder having a hollow wall through an interior of which flows a coolant; and means for guiding the gases along an exterior and said interior of said hollow wall of the cylinder.

9. The improvement as claimed in claim 7, and the unit further comprising:

at least one other said cylinder through which flows a coolant;

cylinder means, situated between the hollow cylinders, for directing said gases in a meandering-like manner; and filters arranged in a path through which the gases flow.

10. The improvement as claimed in claim 9, and further comprising:

at least some of the filters being situated on ends of the cylinders.

11. The improvement as claimed in claim 10, and further comprising:

the filters comprising a metal gauze material.

12. The improvement as claimed in claim 10, and further comprising:

the filters being situated so as to be cooled by at least one of the cylinders.

13. The improvement as in claim 7, and said cleaning means further comprising:

filters.

* * * * *

UNITED STATES PATENT AND TRADEMARK OFFICE
CERTIFICATE OF CORRECTION

PATENT NO. : 5,481,087
DATED : January 2, 1996
INVENTOR(S) : Lambertus P.C. Willemen It is certified that error appears in the above-indentified patent and that said Letters Patent is hereby corrected as shown below:

Column 3, lines 62-63 after "lines" insert means for cooling said gases being prior to cleaning the gases.

Signed and Sealed this

Twenty-sixth Day of November 1996

Attest:

BRUCE LEHMAN

*Attesting Officer*     *Commissioner of Patents and Trademarks*